(12) United States Patent
Mi

(10) Patent No.: US 12,287,489 B2
(45) Date of Patent: Apr. 29, 2025

(54) EXTERNAL CONNECTION APPARATUS FOR HEAD-MOUNTED DIGITAL DEVICE WITH DISPLAY

(71) Applicant: Zhongtian Mi, Chongqing (CN)

(72) Inventor: Zhongtian Mi, Chongqing (CN)

( * ) Notice: Subject to any disclaimer, the term of this patent is extended or adjusted under 35 U.S.C. 154(b) by 0 days.

(21) Appl. No.: 18/462,450

(22) Filed: Sep. 7, 2023

(65) Prior Publication Data
US 2023/0418077 A1    Dec. 28, 2023

(51) Int. Cl.
*G02B 27/01*        (2006.01)

(52) U.S. Cl.
CPC .. *G02B 27/0176* (2013.01); *G02B 2027/0156* (2013.01); *G02B 2027/0161* (2013.01)

(58) Field of Classification Search
CPC ........ G02B 27/0176; G02B 2027/0156; G02B 2027/0161
See application file for complete search history.

(56) References Cited

U.S. PATENT DOCUMENTS

| | | | | |
|---|---|---|---|---|
| 4,136,805 A * | 1/1979 | Storms | | A45F 5/00 |
| | | | | 224/247 |
| 5,941,434 A * | 8/1999 | Green | | A45F 5/02 |
| | | | | 224/195 |
| 6,369,952 B1 * | 4/2002 | Rallison | | G02B 27/0176 |
| | | | | 359/630 |
| 6,457,838 B1 * | 10/2002 | Dugmore | | F21V 21/084 |
| | | | | 362/108 |
| 6,932,309 B1 * | 8/2005 | Corey | | B60R 11/0241 |
| | | | | 24/130 |
| 7,618,260 B2 * | 11/2009 | Daniel | | A44C 5/0007 |
| | | | | 439/528 |
| 7,942,293 B2 * | 5/2011 | Lawrence | | A45D 33/006 |
| | | | | 29/257 |
| 8,342,758 B2 * | 1/2013 | Braithwaite | | A42B 3/042 |
| | | | | 396/419 |
| 9,038,870 B2 * | 5/2015 | Johnson | | A45C 11/00 |
| | | | | 224/181 |
| 9,400,082 B2 * | 7/2016 | Webster | | F16M 13/00 |
| D868,783 S * | 12/2019 | Hoffart | | D14/372 |
| 11,558,075 B2 * | 1/2023 | Edgson | | H04B 1/3877 |
| 2001/0018311 A1 * | 8/2001 | Musacchia | | A01M 31/004 |
| | | | | 446/418 |
| 2003/0075652 A1 * | 4/2003 | Studdiford | | B62J 11/02 |
| | | | | 248/229.17 |
| 2013/0004153 A1 * | 1/2013 | McKee | | F16M 11/14 |
| | | | | 396/419 |
| 2013/0170823 A1 * | 7/2013 | McDonald | | H04M 1/04 |
| | | | | 396/428 |

(Continued)

*Primary Examiner* — Monica E Millner
(74) *Attorney, Agent, or Firm* — Hemisphere Law, PLLC; Zhigang Ma

(57) ABSTRACT

Disclosed herein is an external connection apparatus for a head-mounted digital device with display, wherein the external connection apparatus could transfer the load out of the body and greatly improve comfort during certain functions of the device, such as watching a movie. The device comprises: a support plate for connection between a head-mounted digital device with display and an extracorporeal support; a strap for binding the support plate to the head-mounted digital device with display; and wherein the strap could bind and separate the head-mounted digital device with display to and from the support plate.

7 Claims, 7 Drawing Sheets

(56) References Cited

U.S. PATENT DOCUMENTS

| | | | |
|---|---|---|---|
| 2013/0306689 A1* | 11/2013 | Johnson | A45C 11/00 224/181 |
| 2014/0191095 A1* | 7/2014 | Le Gette | A45F 5/021 248/176.3 |
| 2015/0282548 A1* | 10/2015 | Tulley | A42B 3/04 396/428 |
| 2019/0155037 A1 | 5/2019 | Matsumura et al. | |
| 2019/0235244 A1 | 8/2019 | Kamiya | |
| 2019/0369659 A1 | 12/2019 | Hu et al. | |

* cited by examiner

"π"-shaped variable support plate

Stretch or change the curvature

Shorten or change the curvature

Stretch or change the angle

Shorten or change the angle

EXTERNAL CONNECTION APPARATUS FOR HEAD-MOUNTED DIGITAL DEVICE WITH DISPLAY

TECHNICAL FIELD

The present invention relates to the technical field of the extracorporeal use of a head-mounted digital device with display, and particularly relates to an external connection apparatus for a head-mounted digital device with display.

TECHNOLOGY INVOLVED

At present, head-mounted digital devices with display usually contain many important components: display, main circuit board, CPU, gyroscope, various sensors, dehumidification fan, display driver module, decoding unit, sound module, optical component, wireless transmission unit, diopter adjustment unit, lighting and so on. Based on the current technology, head-mounted digital devices with display tend to be large and heavy, especially the head load is difficult to solve, and in order to alleviate physical discomfort, the so-called "soothing" accessories have been added, making the entire head objects more complex, heavy, and airtight. When used for a long time, it is even as uncomfortable as the Incantation of the Golden Hoop on the Monkey King with scalp pain, neck pain, eye socket pain, eyebrow pain, sweat streaming down the back, dizziness. This is especially reflected in the current bulky all-in-one VR headset. In the virtual immersion experience, all-in-one VR headset needs to move with the head, often for short periods of time, it is acceptable for a while when happiness surpasses pain; however, prolonged and continuous use of it will be very painful, such as watching films.

Watching films is one of the important functions of head-mounted digital devices that contains a display, which will last for a long period of time, so it's in urgent need to release the burden on the head and improve comfort. Even though the manufacturers of head-mounted digital devices with displays have racked their wits about comfort issues, the status quo remains serious due to the reasons of: 1. sticking to the idea of "wearable" while not considering external use or external interfaces. Users have external usage needs, and there have been specialized buckles in the market that can be attached to a certain position of a device, transferring the weight of a digital device with display to an extracorporeal support. Users have reported that it is very comfortable to watch the film, easy and breathable, and convenient to leave at any time without the need to remove and wear it again. However, others have reported extremely poor durability of the buckle because it is hard to contact and prone to breakage due to concentrated force, even causing falling of the device, so buckles are shelved. 3. The manufacturer's products come in all varied shapes and sizes and it's hard to generalize any of the components, even if there is a buckle, it can only be used for one type of device but cannot be used across the device. 5. Because of the uncertainty of the direction of development in this field, manufacturers are not willing to easily invest funds to change the inherent shell structure. For these reasons, the comfort of head-mounted digital devices with displays used over long periods of time has not improved significantly, and the comfort of vintage devices is even easier to be directly ignored by manufacturers. The result is that users continue to endure the heavy load on the head and a large number of devices are left unused and wasted.

The invention of an external connection apparatus for head-mounted digital device with display is imminent and imperative.

Contents of this Invention

The present invention discloses an external connection apparatus for head-mounted digital device with display to solve the problem of head burden and comfort during certain functional states of the head-mounted digital device with display.

The current embarrassment faced in the field of the head-mounted digital device with display: see FIG. 1.

In Order to Achieve the Above Purpose, the
Present Invention Provides the Following Technical
Solutions: See FIG. 2

An external connection apparatus for a head-mounted digital device with display, comprising: 01 support plate, 02 strap, and 03 soft cushion layer. 01 support plate serves to connect with an extracorporeal support, the 02 strap is used to bind the 01 support plate to the head-mounted digital device with display, and the 03 soft cushion layer forms a soft contact between the 01 support plate and the head-mounted digital device with display, and the 03 soft cushion layer makes the 01 support plate and the head-mounted digital device with display better fit and play a role of shock absorption and protection. 02 strap can be both bound and separated. With this external connection apparatus, the weight load of a head-mounted digital device with display can be completely shifted away from the head without affecting the use of the device, so that the device can be used for a long time without head burden, which greatly improves the comfort of the head-mounted digital device with display in certain functional states.

- 01 Support plate is used for connection between the head-mounted digital device with display and the extracorporeal support; 02 strap for binding the 01 support plate to the head-mounted digital device with display; wherein the 02 strap could bind and separate the head-mounted digital device with display to and from the 01 support plate.
- 03 Soft cushion layer is provided between 01 support plate and the head-mounted digital device with display.
- 01 Support plate belongs to a tough and deformable material.
- 01 Support plate comprises a "π"-shaped variable structure that can be stretched, shortened, straightened, curved, altered in radius and altered in angle.
- 02 Strap comprises a VELRO® hook and loop fastener or a tape or a lanyard.
- 02 Strap is vertically placed on the support plate to form a vertical strap structure.
- 03 Strap is transversely placed on the support plate to form a horizontal strap structure.

This Apparatus has the Following Characteristics:

1. This apparatus can make the weight load of the head-mounted digital device with display completely transferred away from the head, and it will be more comfortable for the head without burden, easier to breathe, dry and less foggy.
2. The strap is stable and reliable, soft contact prevents excessive concentration of force, not easy to cause damage to the apparatus itself and the head-mounted digital device with display.

3. The strap is very tolerant to differences in shape, easy to adapt to different device, especially when combined with the deformable support plate and the soft cushion layer, it will demonstrate remarkable general characteristics.

4. When used, the human body can leave at any time, saving the trouble of frequent disassembly and wearing.

Beneficial Effect

This apparatus can activate a large number of unused devices from users by making head-mounted digital devices with display comfortable for the human body in certain functional states in a stable and reliable way, and by increasing users' enthusiasm.

DESCRIPTION OF THE ATTACHED FIGURES

IMPLEMENTATION METHODS

In order to have a better understanding of the technical solutions in the embodiments of the present application, exemplary embodiments will be described in detail here, and examples thereof are shown in the accompanying figures.

Figure 1:
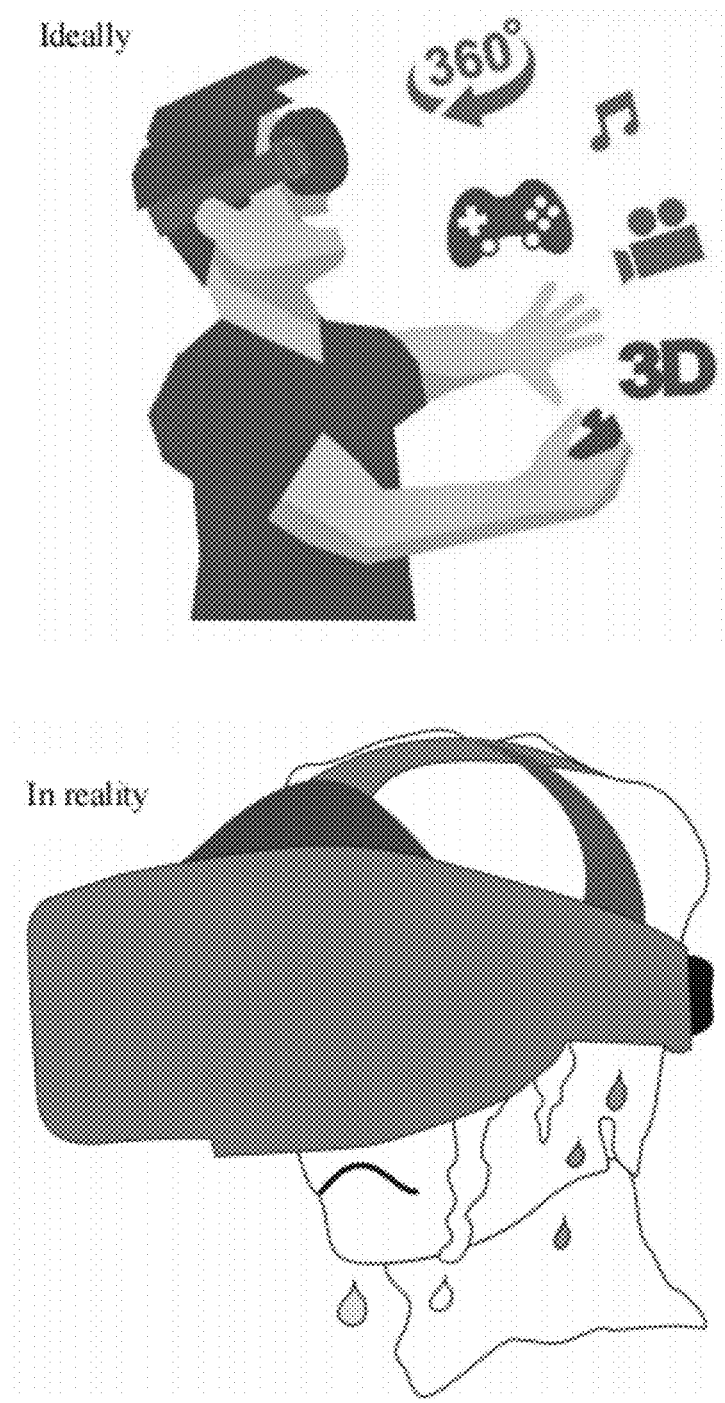
FIG. 1 is a schematic diagram of a wearable device in the prior art.
Figure 2:
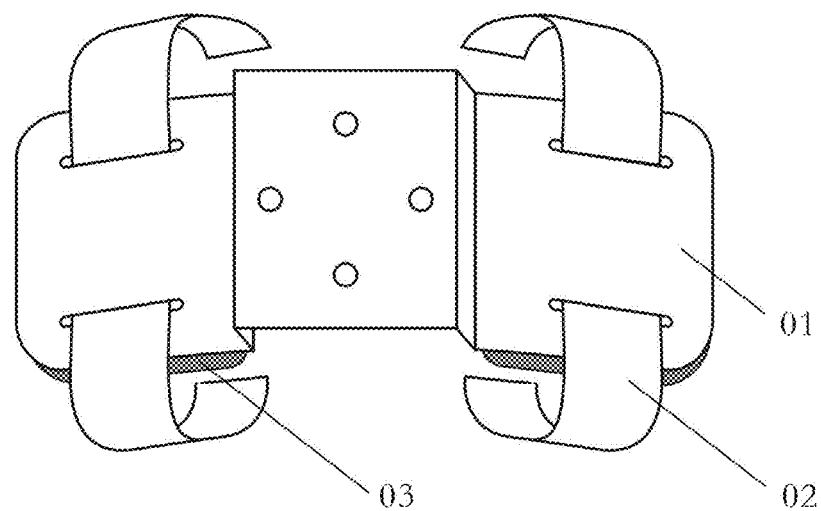
FIG. 2 is one of the structural diagrams of the external connection apparatus provided by the invention; wherein 01 is a support plate, 02 is a strap, and 03 is a soft cushion layer.
Figure 3:
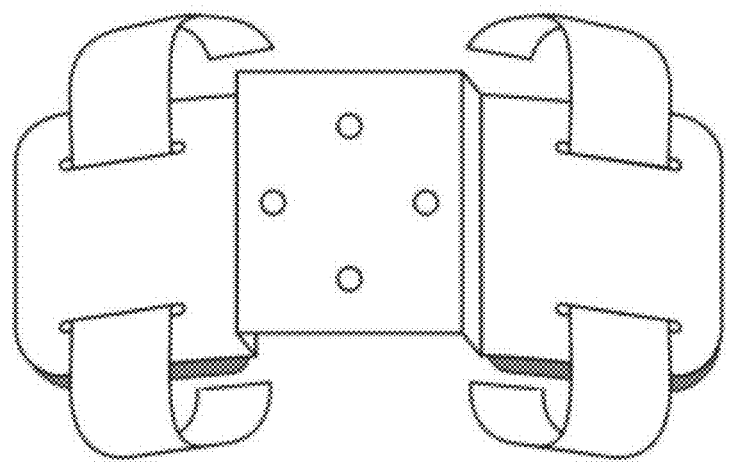
FIG. 3 is another structural diagram of the external connection apparatus provided by the invention.
Figure 3:
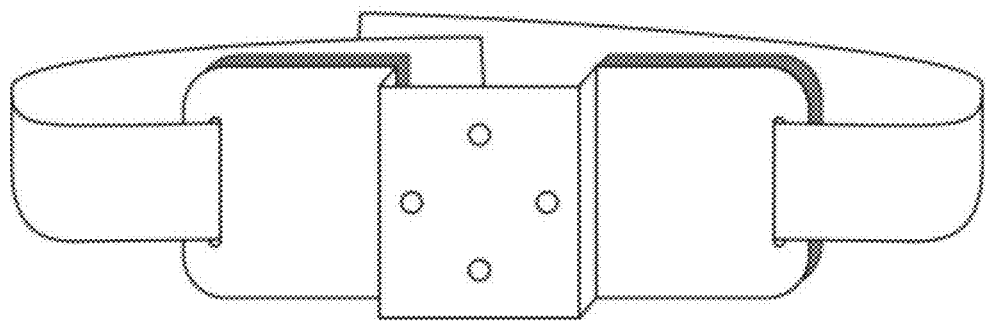

I. Embodiment of the Strapping Method, See FIG. 3

The strap comprises a VELRO® hook and loop fastener or a tape or a lanyard.

The external connection apparatus is divided into vertical strap type and horizontal strap type according to the strapping direction.

Vertical and horizontal straps are relative concepts depending on the angle of perspective and include, but are not limited to, these two forms.

Figure 4:
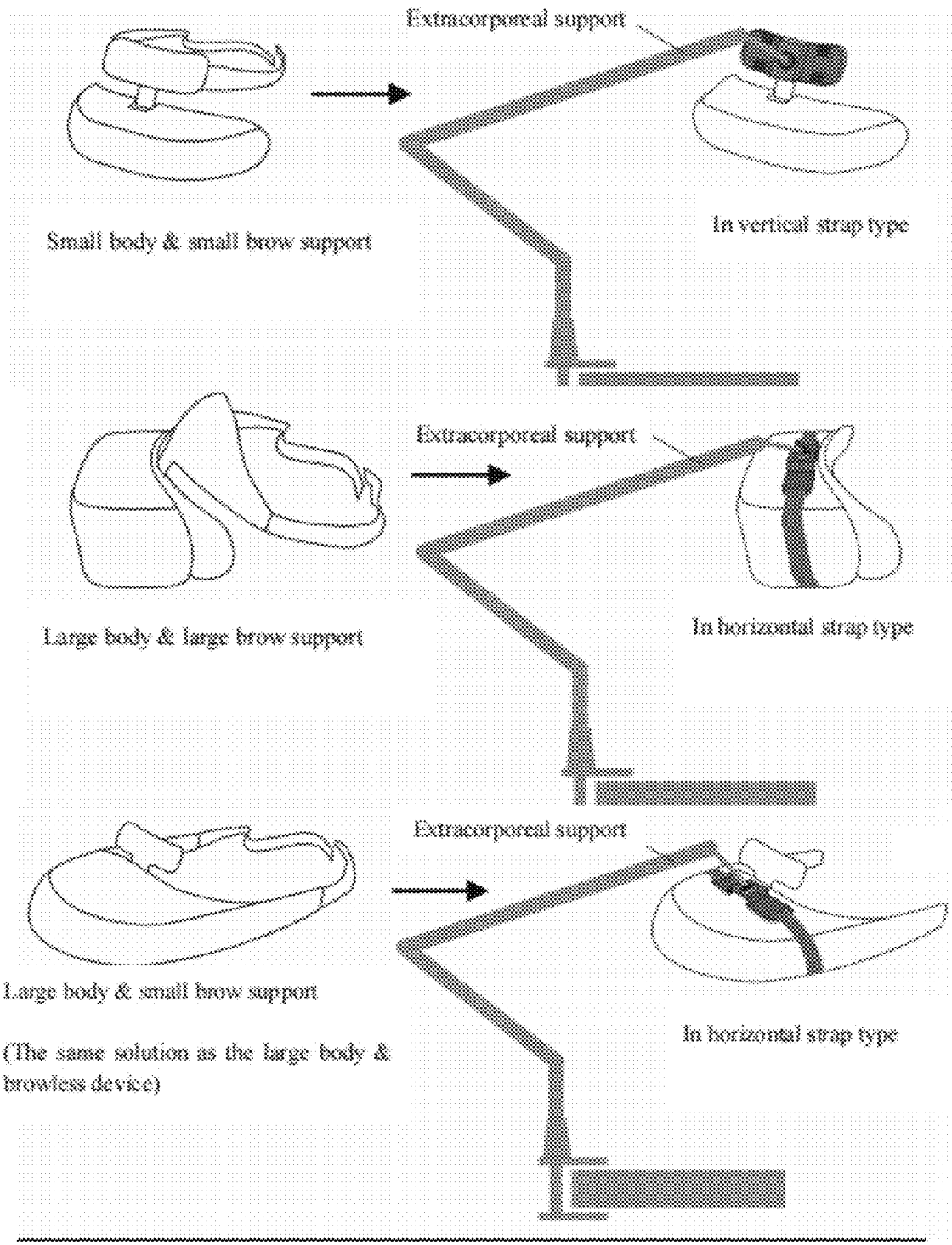
FIG. 4 is one of the schematic diagrams of the connection scene of the external connection apparatus provided by the invention.

II. Embodiment of Different Types of Straps Corresponding to Different Types of Devices, See FIG. 4

1. Horizontal strap type: Small body & small brow support device
2. Vertical strap type: Large body & large brow support device
Large body & small brow support device
Large body & browless device III. Embodiment of Fixed Shaped Support Plate The fixed shaped support plate is formed by matching the support plate to the contact surface of a certain type of head-mounted digital device with display. The shaped support plate and strap are used to externally connect a single device, which is a special embodiment of this technical solution.

Figure 5:
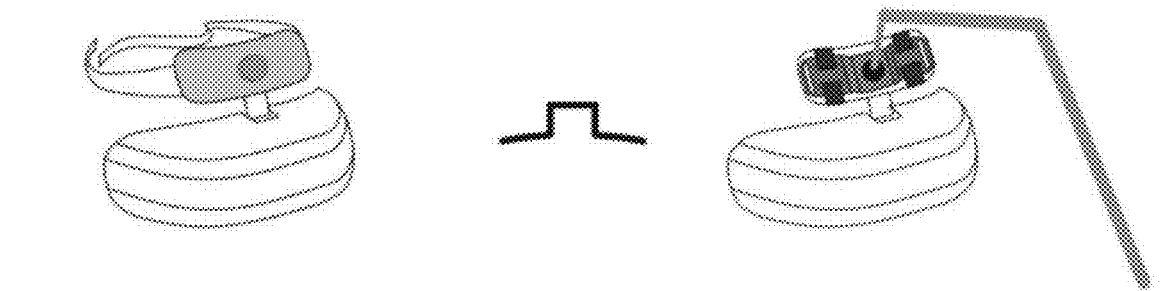
FIG. 5 is another schematic diagram of the connection scene of the external connection apparatus provided by the invention.
Figure 5:
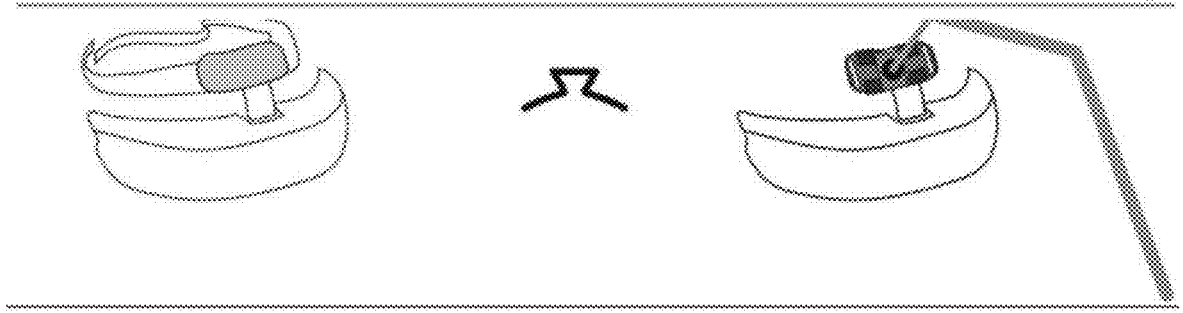
Figure 5:
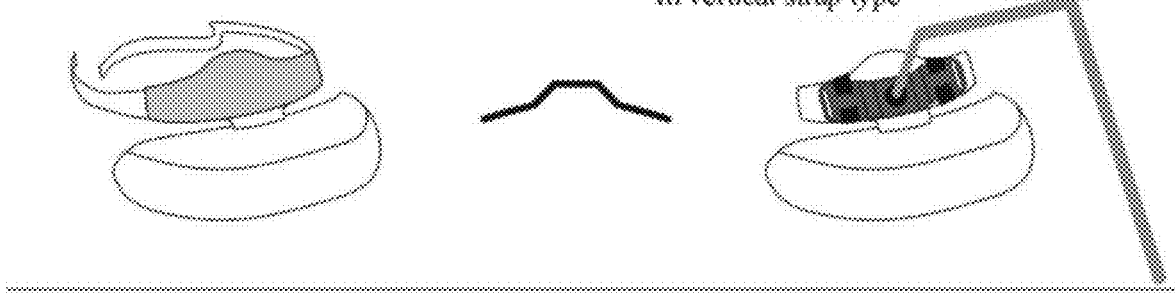
Figure 5:
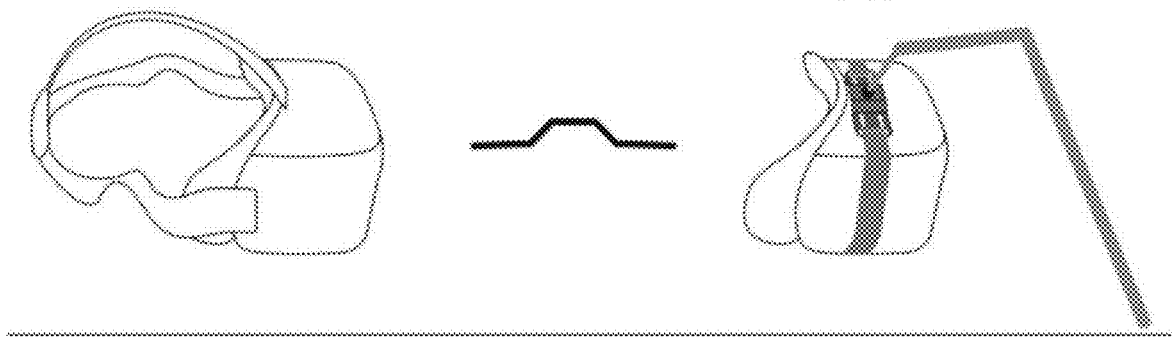
Figure 6:
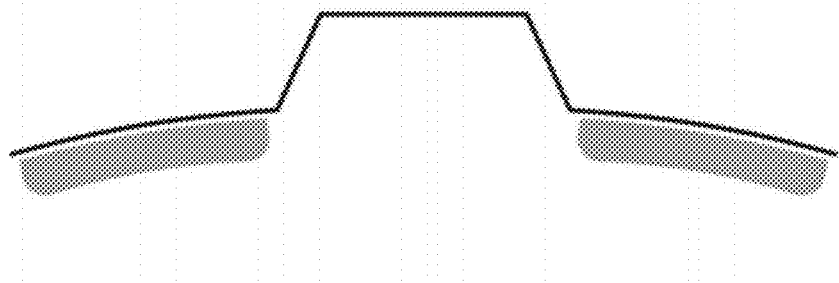
FIG. 6 is another structural diagram of the external connection apparatus provided by the invention.
Figure 6:
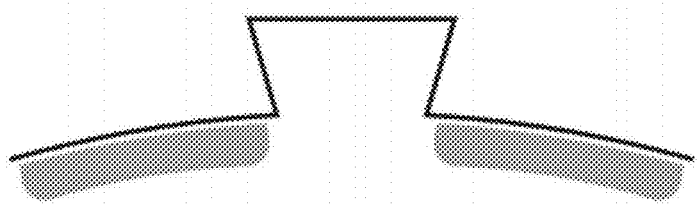
Figure 6:
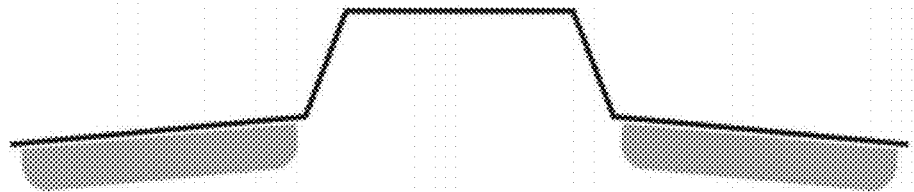
Figure 6:
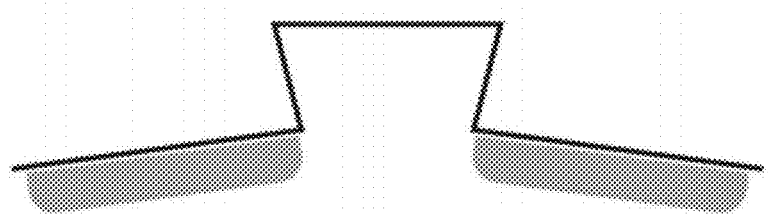
Figure 7:
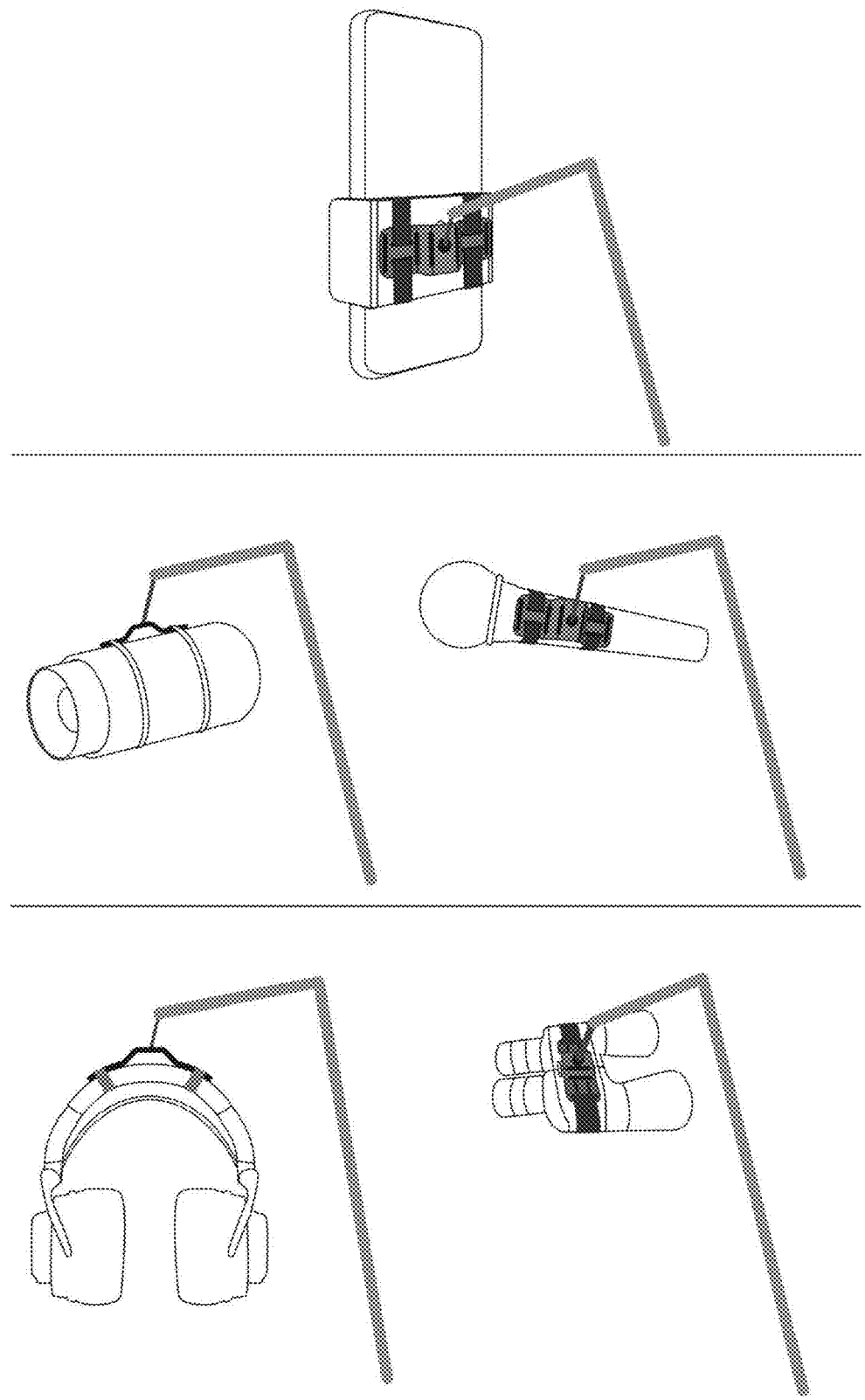
FIG. 7 is a schematic diagram of a multifunctional application provided by the invention.

IV. Embodiment of "π"-Shaped Variable Support Plate, See FIG. 5

The "π"-shaped variable support plate makes it easier to adjust the shape with bare hands to roughly match the contact surface of the head-mounted digital device with display, further fit it with a soft cushion layer, and then fix it with a strap; the deformations include but are not limited to: stretching, compression shortening, changing of the curvature, angle and radius; this structure is applicable to the majority of the head-mounted digital devices with display with obvious general characteristics; this is a general embodiment of the present technical solution.

V. Embodiment of Deformable Material of Support Plate

The support plate belongs to a tough and deformable material and the deformable support plate is made of a flexible and deformable material that is easy to adjust with bare hands. including but not limited to aluminium plate, thin iron plate, thin copper plate and plastic plate.

VI. Embodiment of Other Forms of the Solution

Binding and externally connecting the support plate, the strap, and the head-mounted digital device with display to the extracorporeal support is the core use of this technical solution, and is not limited to the pre-positioned position of the strap, or the thickness value of the soft cushion layer; the strap is pre-separated from the support plate, but the support plate and the head-mounted digital device with display are still bound and connected to the extracorporeal support, which are still embodiments of the present technology.

VII. Embodiment of Multi-Functional Applications of the Invention

The invention could also disengage human body from a variety of other devices such as: mobile phones, tablet computers, telescope, microphones, spotlights, large headphones, etc., reflecting the remarkable multi-functional characteristics and widely expanding the field of application.

The test apparatus, after testing on external connection, has achieved better expected beneficial effects.

What is claimed is:

1. An external connection apparatus for a head-mounted digital device with display, comprising:
   a deformable support plate, which is used for connection between the head-mounted digital device with display and an extracorporeal support;
   a strap, which is used to bind the support plate to the head-mounted digital device with display;
   wherein the strap is configured to detachably bind the head-mounted digital device with display to the support plate; and
   wherein the deformable support plate comprises a support portion configured to be connected to the extracorporeal support and two connection portions extending from two opposite sides of the support portion, wherein the strap is detachably connected with the two connection portions; the support portion is substantially U-shaped and comprises a base plate and two side plates extending from two opposite sides of the base plate to form a U shape, one end of each side plate is connected to the base plate, and another end of each side plate is connected to corresponding one of the two connection portions; the deformable support plate is configured to be deformed by changing angles between the side plates and the base plate or between the side plates and the connection portion so as to change a length, a height and a curvature of the deformable support plate.

2. The external connection apparatus according to claim 1, wherein further comprises a soft cushion layer, the soft cushion layer being provided between the support plate and the head-mounted digital device with display.

3. The external connection apparatus according to claim 1, wherein the support plate belongs to a tough and deformable material.

4. The external connection apparatus according to claim 1, wherein the strap comprises a hook and loop fastener or a tape or a lanyard.

5. The external connection apparatus according to claim 1, wherein the strap is vertically placed on the support plate to form a vertical strap structure.

6. The external connection apparatus according to claim 1, wherein the strap is transversely placed on the support plate to form a horizontal strap structure.

7. A bracket apparatus, wherein the external connection apparatus according to claim 1; and an extracorporeal support connected to the external connection apparatus: the extracorporeal support is used to bear the weight of the external connection apparatus and a head-mounted digital device.

* * * * *